(12) United States Patent
Yamaguchi et al.

(10) Patent No.: US 12,071,554 B2
(45) Date of Patent: Aug. 27, 2024

(54) INK

(71) Applicant: DIC Corporation, Tokyo (JP)

(72) Inventors: Masashi Yamaguchi, Kitaadachi-gun (JP); Kumiko Iizasa, Kitaadachi-gun (JP)

(73) Assignee: DIC CORPORATION, Tokyo (JP)

(*) Notice: Subject to any disclaimer, the term of this patent is extended or adjusted under 35 U.S.C. 154(b) by 0 days.

(21) Appl. No.: 17/768,266

(22) PCT Filed: Oct. 1, 2020

(86) PCT No.: PCT/JP2020/037397
§ 371 (c)(1),
(2) Date: Apr. 12, 2022

(87) PCT Pub. No.: WO2021/075272
PCT Pub. Date: Apr. 22, 2021

(65) Prior Publication Data
US 2024/0150600 A1  May 9, 2024

(30) Foreign Application Priority Data
Oct. 17, 2019  (JP) .................... 2019-190209

(51) Int. Cl.
*C09D 11/322*  (2014.01)
(52) U.S. Cl.
CPC .................. *C09D 11/322* (2013.01)
(58) Field of Classification Search
CPC ..... C09D 11/106; C09D 11/107; C09D 11/30; C09D 11/322
See application file for complete search history.

(56) References Cited

U.S. PATENT DOCUMENTS

2011/0175964 A1* 7/2011 Saito .................. C09D 11/324
524/186
2014/0220366 A1    8/2014 Wang et al.

FOREIGN PATENT DOCUMENTS

| EP | 3 360 682 A1 | 8/2018 | |
|---|---|---|---|
| JP | 2002-265832 A | 9/2002 | |
| JP | 2003-147235 A | 5/2003 | |
| JP | 2003-147236 A | 5/2003 | |
| JP | 2003136853 * | 5/2003 | ............... B41N 1/88 |
| JP | 2007-161823 A | 6/2007 | |
| JP | 2008-63475 A | 3/2008 | |
| JP | 2019-108455 A | 7/2019 | |
| WO | 2012/173032 A1 | 12/2012 | |
| WO | 2013/008691 A1 | 1/2013 | |

OTHER PUBLICATIONS

International Search Report dated Dec. 15, 2020, issued in counterpart International Application No. PCT/JP2020/037397 (3 pages).

\* cited by examiner

*Primary Examiner* — Anh T Vo
(74) *Attorney, Agent, or Firm* — WHDA, LLP

(57) ABSTRACT

A problem to be solved by the present invention is to provide an ink which can be mainly used for ink jet printing and which can produce a printed matter having excellent abrasion resistance and high color development even when the drying time after printing is short. The present invention relates to an ink including a polymer (A) having a carboxyl group and a structure derived from styrenesulfonic acid represented by general formula (1) below, and a polymer (B) different from the polymer (A) and dispersed in water (C) by the polymer (A).

8 Claims, No Drawings

INK

TECHNICAL FIELD

The present invention relates to an ink which can be used for various printing systems, for example, an ink jet printing system and the like.

BACKGROUND ART

An ink jet printer is used for printing on various recording media, for example, plain paper and the like. An ink known as an ink which can be used for printing using the ink jet printer is, for example, an ink containing a pigment, a binder resin, particulate wax, a wetting agent, and water and being characterized in that the particulate wax has a small particle diameter of less than the thickness of a dry ink layer formed on a surface recorded with the ink and the particle diameter is 0.58 to 3 μm (refer to, for example, Patent Literature 1).

On the other hand, a printer widely known as the ink jet printer is capable of printing on both sides of a recording medium such as paper or the like.

The double-sided printing is often performed by, for example, reversing a single-sided printed matter, obtained by printing on one side (surface) of a recording medium, by a transport roller and a reversing mechanism in a printer after drying for a certain time, and then printing on the other side (back) of the single-sided printed matter.

However, when the single-sided printed matter is reversed, the printing surface of the single-sided printed matter may be damaged by contact with the transport roller, thereby causing a decrease in print quality.

CITATION LIST

Patent Literature

PTL 1: Japanese Unexamined Patent Application Publication No. 2007-161823

SUMMARY OF INVENTION

Technical Problem

A problem to be solved by the present invention is to provide an ink which can produce a printed matter having excellent abrasion resistance even when the drying time after printing is short and having high color development when a recording medium such as plain paper or the like is printed.

Solution to Problem

The inventor resolved the problem by an ink including a polymer (A), which has a carboxyl group or a neutralized base of a carboxyl group and a structure represented by general formula (1) below, and a polymer (B) different from the polymer (A) and dispersed in water (C) by the polymer (A).

[Chem. 1]

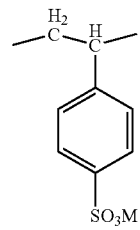

(In the general formula (1), M represents a hydrogen atom or an alkali metal.)

Advantageous Effects of Invention

An ink of the present invention can produce a printed matter having excellent abrasion resistance even when the drying time after printing is short and having high color development when a recording medium such as plain paper or the like is printed, and thus can be preferably used mainly for printing by an ink jet printing system.

DESCRIPTION OF EMBODIMENTS

An ink of the present invention includes a polymer (A), which has a carboxyl group or a neutralized base of a carboxyl group and a structure represented by general formula (1) below, and a polymer (B) different from the polymer (A) and dispersed in water (C) by the polymer (A).

[Chem. 2]

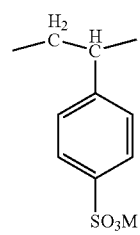

(In the general formula (1), M represents a hydrogen atom or an alkali metal.)

The use of the ink of the present invention can produce a printed matter having excellent abrasion resistance even when the drying time after printing is short and having high color development when a recording medium such as plain paper or the like is printed. Also, the printed matter obtained by using the ink of the present invention not only has excellent abrasion resistance when the drying time after printing is short as described above but also has more excellent abrasion resistance due to drying for about 24 hours.

The polymer (A) is used for stably dispersing the polymer (B) in water (C). Therefore, unlike a pigment dispersion resin described later, the polymer (A) does not substantially contribute to improvement in dispersibility of a pigment described later in the water (C).

A polymer produced by, for example, radical polymerization of a monomer having a polymerizable unsaturated double bond can be used as the polymer (A).

A monomer which can be used as the monomer is a combination of a vinyl monomer having a carboxyl group for introducing a carboxyl group or a neutralized base of a carboxyl group into the polymer (A) and a vinyl monomer for introducing a structure represented by the general formula (1) into the polymer (A), and if required, another vinyl monomer.

Examples of the vinyl monomer having a carboxyl group include acrylic acid, methacrylic acid, β-carboxyethyl (meth)acrylate, 2-(meth)acryloylpropionic acid, crotonic acid, itaconic acid, maleic acid, fumaric acid, itaconate half esters, maleate half esters, β-(meth)acryloyloxyethyl hydrogen succinate, β-(meth)hydroxyethyl hydrogen phthalate, and salts thereof, and acid anhydrides such as maleic anhydride and the like. These can be used alone or in combination of two or more.

The vinyl monomer having a carboxyl group is preferably used within a range of 1% by mass to 80% by mass and, in order to obtain the ink which can produce a printed matter having both more excellent abrasion resistance and color development, preferably used within a range of 5% by mass to 70% by mass, relative to the total amount of the monomers used for producing the polymer (A).

Usable examples of the vinyl monomer for introducing the structure represented by the general formula (1) into the polymer (A) include styrenesulfonic acid, styrenesulfonic acid alkali metal salts, and the like. A styrenesulfonic acid sodium salt is preferably used as a styrenesulfonic acid alkali metal salt in order to obtain the ink which can produce a printed matter having excellent abrasion resistance. Usable examples of an alkali metal compound which can be used for producing alkali metal salts such as the styrenesulfonic acid sodium salt include sodium hydroxide, potassium hydroxide, and the like. The sulfonate groups not neutralized by the alkali metal compound may be partially neutralized by a basic compound described later.

The vinyl monomer for introducing the structure represented by the general formula (1) into the polymer (A) is preferably used within a range of 1% by mass to 80% by mass and, in order to obtain the ink which can produce a printed matter having both more excellent abrasion resistance and color development, the vinyl monomer is preferably used within a range of 5% by mass to 70% by mass, relative to the total amount of the monomers used for producing the polymer (A).

For example, a monomer having a phosphorus atom can be used as the other monomer which can be used for producing the polymer (A).

Usable examples of the monomer having a phosphorus atom include 2-(meth)acryloyloxyethyl acid phosphates (for example, "Light Ester P-1M", "light Acrylate P-1A", and the like manufactured by Kyoeisha Chemical Co., Ltd.), bis(2-(meth)acryloyloxyethyl) acid phosphate, polyalkylene glycol mono(meth)acrylate phosphate esters such as polyethylene glycol monomethacrylate phosphate esters (for example, "Sipomer PAM100", "Sipomer PAM4000", and the like manufactured by Rhodia Nicca Ltd.), polyethylene glycol monoacrylate phosphate esters (for example, "Sipomer PAM5000" and the like manufactured by Rhodia Nicca Ltd.), polypropylene glycol monomethacrylate phosphate esters (for example, "Sipomer PAM200 and the like manufactured by Rhodia Nicca Ltd.), polypropylene glycol monoacrylate phosphate esters (for example, "Sipomer PAM300" and the like manufactured by Rhodia Nicca Ltd.), and the like, and alkylene (meth)acrylate phosphates such as methylene (meth)acrylate phosphate, trimethylene (meth)acrylate phosphate, propylene (meth)acrylate phosphate, tetramethylene (meth)acylate phosphate, and the like.

Examples of the other monomer include (meth)acrylate esters such as methyl (meth)acrylate, ethyl (meth)acrylate, n-butyl (meth)acrylate, isobutyl (meth)acrylate, tert-butyl (meth)acrylate, 2-ethylhexyl (meth)acrylate, hexyl (meth) acrylate, cyclohexyl (meth)acrylate, octyl (meth)acrylate, nonyl (meth)acrylate, dodecyl (meth)acrylate, stearyl (meth) acrylate, isobornyl (meth)acrylate, dicyclopentanyl (meth) acrylate, phenyl (meth)acrylate, benzyl (meth)acrylate, and the like; vinyl esters such as vinyl acetate, vinyl propionate, vinyl butyrate, vinyl versatate, and the like; vinyl ethers such as methyl vinyl ether, ethyl vinyl ether, propyl vinyl ether, butyl vinyl ether, amyl vinyl ether, hexyl vinyl ether, and the like; vinyl-based nitriles such as (meth)acrylonitrile and the like; vinyl-based monomers having an aromatic ring, such as styrene, α-methylstyrene, vinyltoluene, vinylanisole, α-halostyrene, vinylnaphthalene, divinylstyrene, and the like; glycidyl group-containing vinyl-based monomers such as glycidyl (meth)acrylate, allyl glycidyl ether and the like; hydroxyl group-containing vinyl-based monomers such as 2-hydroxyethyl (meth)acrylate, 2-hydroxypropyl (meth) acrylate, polyethylene glycol mono(meth)acrylate, glycerol mono(meth)acrylate, and the like; vinyl-based monomers containing a methylolamide group or an alkoxylated group thereof, such as N-methylol (meth)acrylamide, N-isopropozymethyl (meth)acrylamide, N-butoxymethyl (meth) acrylamide, N-isobutoxymethyl (meth)acrylamide, and the like; amide group-containing vinyl-based monomers such as (meth)acrylamide, N-monoalkyl (meth)acrylamide, N, N-dialkyl (meth)acrylamide, and the like; and the like. These can be used alone or in combination of two or more.

The (meth)acrylate esters such as methyl (meth)acrylate and the like are preferably used as the other vinyl monomer in order to obtain the ink which can produce a printed matter having both more excellent abrasion resistance and color development.

The other vinyl monomer is preferably used within a range of 0.1% by mass to 30% by mass and, in order to exhibit more excellent abrasion resistance, preferably used within a range of 0.1% by mass to 10% by mass, relative to the total amount of the monomers used for producing the polymer (A).

The polymer (A) can be produced by, for example, radical polymerization of a mixture of the vinyl monomers described above, which is supplied at a time or divided and supplied in the presence of the water (C) and, if required, a polymerization initiator and a chain transfer agent.

Usable examples of the polymerization initiator include persulfate salts such as potassium persulfate, sodium persulfate, ammonium persulfate, and the like; peroxides such as benzoyl peroxide, cumene hydroperoxide, tert-butyl hydroperoxide, and the like; hydrogen peroxide; a redox polymerization initiator including a combination of the peroxide and a reductant; azo-based initiators such as 4,4'-azobis(4-cyanovaleric acid), 2,2'-azobis(2-amidinopropane) dihydrochloride; and the like. Usable examples of the reductant include ascorbic acid, erythorbic acid, sodium erythorbate, formaldehyde sulfoxylate metal salts, sodium thiosulfate, and sodium hydrogen sulfite.

Among these, the persulfate salts are preferably used as the polymerization initiator in order to improve the production efficiency of the polymer (A).

Examples of the chain transfer agent include thiomalic acid, thioglycerin, and the like, which can be used alone or in combination of two or more. The thiomalic acid is preferably used for obtaining the ink which has excellent dispersion stability and can produce a printed matter having excellent color development.

In general, the polymer (A) is preferably produced at a temperature within a range of 30° C. to 100° C. for a time within a range of 1 hour to 40 hours. In order to rapidly polymerize the vinyl monomers, the polymer (A) is preferably produced in the presence of inert gas such as nitrogen gas or the like.

If required, the polymer (A) after polymerization of the monomers may be mixed with a basic compound as a neutralizer to form a neutralized base by neutralization of the carboxyl group possessed by the polymer (A) with the basic compound.

Examples of the basic compound include alkali metal compounds such as sodium hydroxide potassium hydroxide, and the like; alkaline-earth metal compounds such as calcium hydroxide, calcium carbonate, and the like; ammonia; organic amines such as monomethylamine, dimethylamine, trimethylamine, monoethylamine, diethylamine, triethylamine, monopropylamine, dimethylpropylamine, monoethanolamine, diethanolamine, dimethylethanolamine, triethanolamine, ethylenediamine, diethylenetriamine, and the like; and the like. These can be used alone or in combination of two or more. Ammonia and ammonia water are preferably used for producing the ink which has excellent dispersion stability and can produce a printed matter having excellent color development.

When the neutralized base is formed by neutralization of the carboxyl group of the polymer (A), a composition can be produced, in which the polymer (A) is dissolved or dispersed in the water (C).

A polymer having a weight-average molecular weight of 1,000 to 2,000,000 is preferably used as the polymer (A) produced by the method described above, and the use of the polymer having a weight-average molecular weight of 3,000 to 1,000,000 can produce the ink which can produce a printed matter having both more excellent abrasion resistance and color development.

Next, the polymer (B) constituting the ink of the present invention is described.

The polymer (B) used has a structure different from that of the polymer (A). The polymer (B) imparts excellent abrasion resistance to the printed matter obtained by using the ink of the present invention.

For example, various polymers such as an acrylic polymer (b), polyurethane, polyester, and the like can be used as the polymer (B). In particular, the acrylic polymer (b) is preferably used as the polymer (B).

A polymer of a (meth)acrylic monomer and another vinyl monomer can be used as the acrylic polymer (b).

Usable examples of the (meth)acrylic monomer include (meth)acrylate esters such as methyl (meth)acrylate, ethyl (meth)acrylate, n-butyl (meth)acrylate, isobutyl (meth)acrylate, tert-butyl (meth)acrylate, 2-ethylhexyl (meth)acrylate, hexyl (meth)acrylate, cyclohexyl (meth)acrylate, octyl (meth)acrylate, nonyl (meth)acrylate, dodecyl (meth)acrylate, stearyl (meth)acrylate, isobornyl (meth)acrylate, dicyclopentanyl (meth)acrylate, phenyl (meth)acrylate, benzyl (meth)acrylate, and the like; and hydroxyl group-containing vinyl monomers such as 2-hydroxyethyl (meth)acrylate and the like.

For example, the acrylic polymer (b) as the polymer (B) can be produced by polymerizing a mixture of vinyl monomers such as the (meth)acrylate ester, the hydroxyl group-containing vinyl monomer, and the like.

On the other hand, the ink of the present invention contains the polymer (B) dispersed in the water (C) by the polymer (A). Therefore, the polymer (B) is preferably produced in the presence of the polymer (A) in order to obtain the ink which has excellent dispersion stability and can produce a printed matter having excellent abrasion resistance.

A specific example of a method for producing the polymer (B) is a method of polymerizing the (meth)acrylic monomer and the like constituting the acrylic polymer (b), which are supplied at a time or divided and supplied to a composition in which the polymer (A) is dissolved or dispersion in the water (C).

The method described above can produce a composition in which the polymer (B) is dispersed in the water (C) by the polymer (A), and the composition can be used for the ink of the present invention.

Usable examples the water (C) include pure water such as ion exchange water, ultrafiltered water, reverse osmosis-treated water, distilled water, and the like, and ultrapure water. Also, water sterilized by ultraviolet irradiation or hydrogen peroxide addition, or the like is preferably used as the water because the occurrence of mold or bacteria can be prevented when the ink of the present invention is stored for a long time.

The water (C) is preferably contained within a range of 40% by mass to 95% by mass and, in order to obtain the ink which can produce a printed matter having both more excellent abrasion resistance and color development, is preferably contained within a range of 50% by mass to 90% by mass, relative to the total amount of the ink of the present invention.

The ink of the present invention preferably contains the polymer (A) and the polymer (B) within a range of 0.1% by mass to 30% by mass in a total and, in order to obtain the ink which can produce a printed matter having more excellent abrasion resistance, preferably within a range of 0.1% by mass to 20% by mass in total, relative to the total amount of the ink.

The ink of the present invention produced by the method described above preferably contains the polymer (A) and the polymer (B) at a mass ratio [polymer (A)/polymer (B)] within a range of 1/100 to 30/100 and, in order to obtain the ink which can produce a printed matter having more excellent abrasion resistance, more preferably within a range of 1/100 to 20/100.

An ink containing, if required, other components other than the polymer (A), the polymer (B), and the water (C) can be used as the ink of the present invention.

Usable examples of the other components include a coloring material such as a pigment, a dye, or the like, a pigment dispersion resin, a solvent other than the water (C), a wetting agent, a lubricant, an alkali agent, a pH adjuster, a surfactant, a preservative, a chelating agent, a plasticizer, an antioxidant, wax, au ultraviolet absorber, and the like.

For example, organic pigments or inorganic pigments can be used alone or in combination or two or more as the pigment.

Usable examples of the organic pigments include a quinacridone-based pigment, a quinacridone/quinone-based pigment, a dioxazine-based pigment, a phthalocyanine-based pigment, a phthalone-based pigment, an isoindolinone-based pigment, a methine/azomethine-based pigment, an anthrapyrimidine-based pigment, an anthanthrone-based pigment, an indusrone-based pigment, a fravanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an azolake-based pigment, an insoluble azo-based pigment, a condensed azo-based pigment, and the like.

Usable examples of the inorganic pigments include titanium dioxide, zinc oxide, iron oxide, chromium oxide, iron black, cobalt blue, alumina white, yellow iron oxide, viridian, zinc sulfide, lithopone, cadmium yellow, vermillion, cadmium red, chrome yellow, molybdate orange, zinc chromate, strontium chromate, white carbon, clay, talc, ultramarine blue, precipitated barium sulfate, barite powder, calcium carbonate, white lead, Prussian blue, manganese violet, carbon black, aluminum powder, pearl-based pigment, and the like.

A pigment self-dispersible in water can also be used as the pigment.

The pigment is preferably used within a range of 0.1% by mass to 20% by mass and, in order to obtain the ink having good storage stability and having excellent ejection stability when used for an ink jet printing method, the pigment is preferably used within a range of 5% by mass to 10% by mass, relative to the total amount of the ink.

When the pigment is used as the coloring material, a pigment dispersion resin is preferably used for stably dispersing the pigment in the water (C). Unlike the polymer (A), the pigment dispersion resin adsorbs around the particles of the pigment to impart dispersion stability in the water (C) to the pigment.

For example, a pigment dispersion resin having an anionic group can be used as the pigment dispersion resin. Examples of the anionic group include a carboxyl group, a sulfonate group, a phosphate group, and the like.

In particular, a resin having a hydrophobic structural unit and a structural unit derived from a hydrophilic anionic group is preferably used as the pigment dispersion resin having an anionic group in order to obtain the ink which has a high degree of freedom for designing a structure maintaining stability of the ink of the present invention and which can form a printed matter having excellent color development when printed on plain paper.

For example, a piment dispersion resin having a structural unit derived from styrene and a structural unit derived from acrylic acid can be used as the pigment dispersion resin having a hydrophobic structural unit and a structural unit derived from a hydrophilic anionic group.

A resin having an acid value within a range of 60 to 300 mgKOH/g is preferably used as the resin having a hydrophobic structural unit and a structural unit derived from a hydrophilic anionic group, and a resin having an acid value within a range of 100 to 250 mgKOH/g is suitably used from the viewpoint of achieving balance between pigment dispersibility, ink stability, and high print density.

From the viewpoint of achieving balance between pigment dispersibility in the water (C), ink stability, abrasion resistance, high print density, and ejection property, a resin used as the resin having a hydrophobic structural unit and a structural unit derived from a hydrophilic anionic group preferably has a weight-average molecular weight within a range of 3000 to 50000, more preferably within a range of 4000 to 40000, still more preferably within a range of 5000 to 30000, and particularly preferably within a range of 5000 to 20000.

A resin used as the resin having a hydrophobic structural unit and a structural unit derived from a hydrophilic anionic group preferably has a glass transition temperature within a range of 60° C. to 150° C. and more preferably within a range of 70° ° C. to 150° C. in order that even when the ink of the present invention is applied to an ink jet printing method of a thermal jet system, excellent ejection stability is maintained without deterioration of the resin due to the influence of heat derived from the thermal jet system.

A resin used as the resin having a hydrophobic structural unit and a structural unit derived from a hydrophilic anionic group preferably can be made water dispersible by neutralization of the anionic group and preferably has the ability to form particles stably dispersed in water without using a dispersion stabilizer such as an emulsifier or the like under the action of a basic compound serving as a neutralizer.

When a resin having an anionic group is used as the pigment dispersion resin, an inorganic basic compound and an organic basic compound can be used as a basic compound which can be used for neutralizing the anionic group. In order to obtain the ink having more excellent storage stability, an inorganic basic compound is preferably sed as the basic compound.

Usable examples of the inorganic basic compound include alkali metal hydroxides, ammonium hydroxide, and the like, and alkali metal hydroxides, such as potassium hydroxide, sodium hydroxide, and the like, are preferably used for imparting more excellent dispersion stability to the pigment. In view of improvement in mixing properties, an aqueous solution prepared by previously dissolving or dispersing in water at a concentration of 20% by mass to 50% by mass can be used as the inorganic basic compound.

Usable examples of the organic basic compound include amines such as methylamine, dimethylamine, trimethylamine, ethylamine, diethylamine, triethylamine, diethanolamine, triethanolamine, and the like. The amines are generally liquid and thus can be used as they are.

The content of the basic compound is preferably adjusted so that the neutralization rate of the resin having an anionic group is preferably 50% or more and more preferably 80% or more in order to improve the dispersion rate in the water (C) and secure good dispersion stability and long-term storage stability. The upper limit value of the neutralization rate is not particularly limited, but is substantially preferably 200% or less and more preferably 120% or less in order to cause stability of the ink and no gelation even in long-term storage. Herein, the neutralization rate is a value calculated by the following formula.

$$\text{Neutralization rate (\%)} = [\{\text{mass of basic compound (g)} \times 56.11 \times 1000\} / \{\text{acid value of pigment dispersion resin (mgKOH/g)} \times \text{equivalent of basic compound} \times \text{mass of pigment dispersion resin (g)}\}] \times 100$$

More specific usable examples of the pigment dispersion resin include a polyester resin having an anionic group, an epoxy resin having an anionic group, a urethane resin having an anionic group, an acrylic acid-based resin having an anionic group, a maleic acid-based resin having an anionic group, a styrene-based resin having an anionic group, a vinyl-based copolymer having an anionic group such as a polyvinyl acetate-based resin having an anionic group, and the like.

Other usable examples of the pigment dispersion resin include poly(meth)acrylic acid, vinyl acetate-acrylate ester copolymer, acrylic acid-acrylic acid alkyl ester copolymer, styrene-(meth)acrylic acid copolymer, styrene-(meth)acrylic acid-acrylic acid alkyl ester copolymer, styrene-maleic acid copolymer, vinyl acetate-maleate ester copolymer, vinyl acetate-crotonic acid copolymer, and vinyl acetate-acrylic acid copolymer.

Usable examples of the wetting agent include polyhydric alcohols such as ethylene glycol, glycerol, and the like; polyhydric alcohol ethers such as ethylene glycol monoethyl ether, ethylene glycol monobutyl ether, and the like; polyoxyalkylene adducts of glycerin; nitrogen-containing heterocyclic compounds such as N-methyl-2-pyrrolidone, γ-butyrolactone, and the like; amides such as N,N-dimethylformamide and the like; organic amines such as triethylamine and the like; sulfur-containing compounds such as dimethylsulfoxide and the like; propylene carbonate; ethylene carbonate; and the like. These can be used alone or in combination of two or more.

The wetting agent used preferably has a high boiling point for uniformly dispersing the pigment and the pigment dispersion resin. More preferably used are polyhydric alcohols such as ethylene glycol, propylene glycol, diethylene glycol, dipropylene glycol, triethylene glycol, polyethylene glycol, polypropylene glycol, glycerin, glycerin polyethylene oxide adduct and the like.

The wetting agent is preferably used within a range of 10% by mass to 300% by mass and more preferably within a range of 30% by mass to 200% by mass relative to the total amount of the pigment.

When an ink containing the pigment and the pigment dispersion resin is used as the ink of the present invention, a method for producing the ink of the present invention is, for example, a production method of mixing an aqueous pigment dispersion, which is previously prepared by mixing the pigment, the pigment dispersion resin, and the water (C), and a composition containing the polymer (A), the polymer (B), and the water (C).

The aqueous pigment dispersion can be produced through, for example, the step [1] of kneading a composition containing the pigment, the pigment dispersion resin, and if required, the basic compound and the wetting agent, and the step [2] of diluting and dispersing the kneaded product produced in the step [1] in the water (C), etc.

In the steps [1] and [2], when the pigment dispersion resin is properly selected, affinity of the pigment dispersion resin for the pigment is significantly improved, and thus dispersion stability of the aqueous resin dispersion can be improved, and luster, durability, and water resistance of the printed matter formed by printing the ink obtained using the pigment dispersion on plain paper can be improved.

The step [1] can use an apparatus, for example, a roll mill, a Henschel mixer, a pressure kneader, s planetary mixer, or the like, and an apparatus such as a Henschel mixer including a sealable stirring tank and stirring blade, a pressure kneader, a planetary mixer, or the like is preferably used because the solid content ratio of the composition in the step [1] can be maintained constant, and the kneaded product having a good dispersion state can be obtained. The planetary mixer is preferably used because kneading can be performed within a wide viscosity range.

Also, the step [2] is the step of diluting and dispersing the kneaded product obtained in the step [1] in the water (C).

The aqueous pigment dispersion produced by the method described above is preferably centrifuged or filtered for removing coarse particles and aggregated particles derived from the raw materials such as the pigment in order to prevent the occurrence of clogging of ink ejection nozzles or the like when the ink of the present invention is applied to an ink jet printing method.

A method for producing the ink by mixing the aqueous pigment dispersion and the composition, containing the polymer (A), the polymer (B), and the water (C), is, for example, a method of supplying the water (C) to the aqueous pigment dispersion and stirring the mixture for 30 to 90 minutes, or the like.

An ink used as the ink of the present invention produced by the method described above preferably has a viscosity within a range of 1 mPa·sec to 10 mPa·sec. In particular, when the ink of the present invention is ejected by an ink jet printing system described later, the ink used more preferably has a viscosity within a range of 1 mPa·sec to 6 mPa·sec.

In addition, an ink used as the ink of the present invention produced by the method described above preferably has a pigment mass ratio of 1% by mass to 10% by mass relative to the total amount of the ink, and in order to obtain the ink having more excellent storage stability, the ink used particularly preferably has a pigment mass ratio of 3% by mass to 8% by mass.

The ink of the present invention can be used for printing on a recording medium.

For example, finely coated paper having a surface thinly coated with a chemical that promotes drying of the ink can be used as the recording medium. Even when plain paper is selected as the recording medium, the ink of the present invention can produce a printed matter with high luster.

Typical examples of the plain paper include paper for PPC used for an electrophotographic copying machine or the like, and the like. The plain paper has different use rates of used paper pulp, bleach degrees, etc., according to brands and has various thicknesses, but an ink receiving layer or the like is not applied in exchange for low cost. Therefore, particularly in the case of double-sided printing using an ink jet printing system, when the single-sided printed matter formed by printing on one side (surface) of plain paper is reversed, the printing surface of the single-sided printed matter is damaged by contact with a transport roller, thereby easily causing a decrease in print quality.

The ink of the present invention can produce a printed matter having little damage and high color development even in double-sided printing on the plain paper.

The ink of the present invention can be applied to various printing systems, but can be preferably used for a printing scene mainly in an ink jet printing system.

Examples of the ink jet printing system include a continuous injection type (a charge control type, a spry type, and the like), an on-demand type (a piezo system, a thermal system, an electrostatic suction system, and the like), and the like, but the ink of the present invention is suitable for printing in a thermal-type ink jet printing system. When an aqueous ink for ink jet recording is applied to these various ink jet systems, basically, the ink can be extremely stably ejected, and good scratch resistance and abrasion resistance of the formed image can be realized.

As described above, the printed matter printed using the ink of the present invention can have both excellent abrasion resistance and high color development.

In particular, in an ink jet printer capable of printing on both surfaces of a recording medium, in many cases, a single-sided printed matter obtained by printing on one side (surface) of the recording medium is dried for a certain time and then reversed by a transport roller and a reversing mechanism in the printer, and then the other side (back) of the single-sided printed matter is printed. When the single-sided printed matter is reversed, the printing surface of the single-sided printed matter is damaged by contact with the transport roller, thereby causing a concern with decrease in print quality. However, the ink of the present invention causes little damage due to excellent abrasion resistance even in double-sided printing on plain paper and can effectively prevent a decrease in color development in printing on plain paper.

EXAMPLES

Example 1

In a reactor provided with a stirrer, a reflux condenser, a nitrogen inlet tube, a thermometer, and a dropping funnel, 138 parts by mass of deionized water was charged and heated to 80° C. under nitrogen blowing.

Next, 2 parts by mass of methacrylic acid, 2 parts by mass of sodium styrenesulfonate, and 0.05 parts by mass of thiomalic acid were charged, and 5 parts by mass of a 10 mass& aqueous sodium persulfate solution was added at 80° C., followed by initiation of polymerization.

The temperature in the polymerization vessel was kept at 80° ° C. for 1 hour, and then the contents in the polymerization vessel were cooled and mixed with ammonia water, thereby producing an aqueous solution (I-1) of polymer (A-1).

Next, 100 parts by mass of a mixture of 50 parts by mass of n-butyl acrylate, 30 parts by mass of methyl methacrylate, and 20 parts by mass of 2-hydroxyethyl methacrylate and 5 parts by mass of a 10 mass aqueous sodium persulfate solution were added dropwise to the aqueous solution (I-1) of polymer (A-1) adjusted to 80° C. over 4 hours and polymerized by being maintained for 1 hour.

After the passage of 1 hour, the contents in the reactor were cooled to 40° C. or less.

After the cooling, the contents to the reactor were adjusted to ph 7 by supplying ammonia water, thereby producing a dispersion (II-1) with a nonvolatile content of 40% by mass.

Next, in a planetary mixer with a volume of 50 L (manufactured by Inoue Seisakusho Co., Ltd.), 5000 parts by mass of Joncryl JDX-6639 (manufactured by BASF Corporation, aqueous styrene-acrylic resin solution, weight-average molecular weight; 8,000, acid value: 120 to 130, glass transition temperature: 70° C., viscosity: 1,500 mPa·s, pH 8, nonvolatile content: about 29% by mass) and 5000 parts by mass of magenta pigment (FASTOGEN Super Magenta RY, manufactured by DIC Corporation) were charged, and a jacket was heated.

After the temperature of the contents in the planetary mixer reached 60° C., the contents were stirred and mixed under the conditions in which number of rotations: 80 rotations/min, and number of revolutions: 25 revolutions/min.

Five minutes after the start of stirring, 3,700 parts by mass of triethylene glycol was added.

Then, mixing was continued until 120 minutes passed starting from the time when the current value of the planetary mixer showed the maximum current value, thereby producing a kneaded product.

Next, 10,000 parts by mass of ion exchange water of 60° C. was added to the kneaded product over 2 hours to prepare a liquid mixture. The mass ratio of the styrene-acrylic resin to the magenta pigment contained in the liquid mixture was 0.29.

Next, ion exchange water and triethylene glycol were added to the liquid mixture to produce a magenta aqueous pigment dispersion having a magenta pigment concentration of 14.3% by mass and a triethylene glycol concentration of 100% by mass relative to the magenta pigment.

Next, in a 100 mL plastic vessel, 2.1 parts by mass of the dispersion (II-1), 5.6 parts by mass of 2-pyrrolidinone (manufactured by BASF Corporation), 5.6 parts by mass of triethylene glycol monobutyl ether (manufactured by Tokyo Chemical Industry Co., Ltd.), 2.1 parts by mass of purified glycerin (manufactured by Kao Corporation), 0.3 parts by mass of Surfynol 440 (nonionic surfactant, 2,4,7,9-tetramethyl-5-decine-4,7-diol, Evonik Japan Co., Ltd.), and ion exchange water were added and stirred for 1 hour, and then 24.5 parts by mass of the magenta aqueous pigment dispersion was further added and stirred for 1 hour.

Next, the pH of the resultant mixture was adjusted within a range of 9 to 9.8 by using a 5 masse aqueous potassium hydroxide solution and then filtered with a filter having a pore diameter of 5 to 10 μm, thereby producing a total of 70 parts by mass of an aqueous ink (magenta pigment concentration: 5% by mass).

Example 2

In a reactor provided with a stirrer, a reflux condenser, a nitrogen inlet tube, a thermometer, and a dropping funnel, 138 parts by mass of deionized water was charged and heated to 80° C. under nitrogen blowing.

Next, 4.5 parts by mass of methacrylic acid, 5.6 parts by mass of sodium styrenesulfonate, and 0.15 parts by mass of thiomalic acid were charged, and 5 parts by mass of a 10 mass % aqueous ammonium persulfate solution was added at 80° C., followed by initiation of polymerization.

The temperature in the polymerization vessel was kept at 80° C. for 1 hour, and then the contents in the polymerization vessel were cooled and mixed with ammonia water, thereby producing an aqueous solution (I-2) of polymer (A-2).

Next, 100 parts by mass of a mixture of 40 parts by mass of ethyl acrylate, 30 parts by mass of methyl methacrylate, and 30 parts by mass of 2-hydroxyethyl methacrylate and 5 parts by mass of a 10 mass % aqueous ammonium persulfate solution were added dropwise to the aqueous solution (I-2) of polymer (A-2) over 4 hours and polymerized by being maintained for 1 hour.

After the passage of 1 hour, the contents in the reactor were cooled to 40° C. or less.

After the cooling, the contents in the reactor were adjusted to pH 7 by supplying ammonia water, thereby producing a dispersion (II-2) with a nonvolatile content of 40% by mass.

Next, in a 100 mL plastic vessel, 2.1 parts by mass of the dispersion (II-2), 5.6 parts by mass of 2-pyrrolidinone (manufactured by BASF Corporation), 5.6 parts by mass of triethylene glycol monobutyl ether (manufactured by Tokyo Chemical Industry Co., Ltd.), 2.1 parts by mass of purified glycerin (manufactured by Kao Corporation), 0.3 parts by mass of Surfynol 440 (nonionic surfactant, 2,4,7,9-tetramethyl-5-decine-4,7-diol, Evonik Japan Co., Ltd.), and ion exchange water were added and stirred for 1 hour, and then 24.5 parts by mass of the magenta aqueous pigment dispersion was further added and stirred for 1 hour.

Next, the pH of the resultant mixture was adjusted within a range of 9 to 9.8 by using a 5 mass % aqueous potassium hydroxide solution and then filtered with a filter having a pore diameter of 5 to 10 μm, thereby producing a total of 70 parts by mass of an aqueous ink (magenta pigment concentration: 5% by mass).

Example 3

In a reactor provided with a stirrer, a reflux condenser, a nitrogen inlet tube, a thermometer, and a dropping funnel, 138 parts by mass of deionized water was charged and heated to 80° C. under nitrogen blowing.

Next, 4.5 parts by mass of methacrylic acid, 5.6 parts by mass of sodium styrenesulfonate, and 0.15 parts by mass of thiomalic acid were charged, and 5 parts by mass of a 10 mass % aqueous ammonium persulfate solution was added at 80° C., followed by initiation of polymerization.

The temperature in the polymerization vessel was kept at 80° C. for 1 hour, and then the contents in the polymerization vessel were cooled and mixed with ammonia water, thereby producing an aqueous solution (I-3) of polymer (A-3).

Next, 100 parts by mass of a mixture of 32 parts by mass of ethyl acrylate, 23 parts by mass of n-butyl acrylate, 5 parts by mass of methyl methacrylate, and 40 parts by mass of 2-hydroxyethyl methacrylate and 5 parts by mass of a 10 mass % aqueous ammonium persulfate solution were added dropwise to the aqueous solution (I-3) of polymer (A-3) over 4 hours and polymerized by being maintained for 1 hour.

After the passage of 1 hour, the contents in the reactor were cooled to 40° ° C. or less.

After the cooling, the contents in the reactor were adjusted to ph 7 by supplying ammonia water, thereby producing a dispersion (II-3) with a nonvolatile content of 40% by mass.

Next, in a 100 mL plastic vessel, 2.1 parts by mass of the dispersion (II-3), 5.6 parts by mass of 2-pyrrolidinone (manufactured by BASF Corporation), 5.6 parts by mass of triethylene glycol monobutyl ether (manufactured by Tokyo Chemical Industry Co., Ltd.), 2.1 parts by mass of purified glycerin (manufactured by Kao Corporation), 0.3 parts by mass of Surfynol 440 (nonionic surfactant, 2,4,7,9-tetramethyl-5-decine-4,7-diol, Evonik Japan Co., Ltd.), and ion exchange water were added and stirred for 1 hour, and then 24.5 parts by mass of the magenta aqueous pigment dispersion was further added and stirred for 1 hour.

Next, the pH of the resultant mixture was adjusted within a range of 9 to 9.8 by using a 5 masse aqueous potassium hydroxide solution and then filtered with a filter having a pore diameter of 5 to 10 μm, thereby producing a total of 70 parts by mass of an aqueous ink (magenta pigment concentration: 5% by mass).

Comparative Example 1

In a reactor provided with a stirrer, a reflux condenser, a nitrogen inlet tube, a thermometer, and a dropping funnel, 86 parts by mass of deionized water was charged and heated to 75° C. under nitrogen blowing. Then, 0.02 parts by mass of ammonium persulfate was added under stirring, and then a monomer mixture containing 168 parts by mass of n-butyl acrylate, 20 parts by mass of methyl methacrylate, and 12 parts by mass of methacrylic acid was emulsified by adding 16 parts by mass of Latemul E-118B (manufactured by Kao Corporation, effective component: 25% by mass) and 60 parts by mass deionized water, producing a monomer pre-emulsion (representing a monomer emulsified state created by the monomers, the emulsifier, and water). A portion (3 parts by mass) of the resultant monomer pre-emulsion was added and polymerized for 60 minutes while the temperature in the reactor was kept at 75° C. Then, the remaining monomer pre-emulsion (273 parts by mass) and 30 parts by mass of an aqueous ammonium persulfate solution (effective component: 5% by mass) were added dropwise over 180 minutes by using separate dropping funnels and polymerized while the temperature in the reactor was kept at 75° C.

After the completion of dropping, the polymerized product was stirred at the same temperature for 120 minutes, and then the carboxyl group in the polymer was neutralized by adding dropwise 15 parts by mass of ammonia water (effective component: 10% by mass) over 30 minutes while the temperature in the reactor was kept at 75° C., thereby producing a dispersion (II-11) with a nonvolatile content of 50% by mass.

An aqueous ink was prepared by the same method as in Example 1 except that 1.7 parts by mass of the dispersion (II-11) was used in place of 2.1 parts by mass of the dispersion (II-1).

Comparative Example 2

An aqueous ink was prepared by the same method as in Comparative Example 1 except that Neopelex G-25 (manufactured by Kao Corporation) was used in place of Latemul E-118B (manufactured by Kao Corporation).

Comparative Example 3

An aqueous ink was prepared by the same method as in Comparative Example 1 except that Latemul PD-104 (manufactured by Kao Corporation) was used in place of Latemul E-118B (manufactured by Kao Corporation).

<Abrasion Resistance>

Each of the aqueous inks was filled in a black ink cartridge and solid-printed, with a set print density of 100%, on a printing surface of photo printing paper (luster) [HP advanced photo paper manufactured by Hewlett Packard Company] by using a commercial thermal jet system ink jet printer (Photosmart D5360; manufactured by Hewlett Packard Company), producing a printed matter for evaluation.

The printed matter for evaluation was dried at room temperature for 60 seconds, and then the printing surface was scratched with a claw at a load of about 5 kg applied, and the degree of abrasion of color or the like of the printing surface was visually evaluated according to the evaluation criteria below. When the printed matter for evaluation could not be obtained due to the insufficient ejection stability of the ink, it is described as "Impossible to print" in tables.

A: The ratio of the damaged area to the area of the printing surface is less than 30%.
B: The ratio of the damaged area to the area of the printing surface is 30% or more and less than 50%.
C; The ratio of the damaged area to the area of the printing surface is 50% or more.

<Color Development>

First, in a 100 ml plastic vessel, 5.6 parts by mass of 2-pyrrolidinone (manufactured by BASF Corporation), 5.6 parts by mass of triethylene glycol monobutyl ether (manufactured by Tokyo Chemical Industry Co., Ltd.), 2.1 parts by mass of purified glycerin (manufactured by Kao Corporation), 0.3 parts by mass of Surfynol 440 (nonionic surfactant, 2,4,7,9-tetramethyl-5-decine-4,7-diol, Evonik Japan Co., Ltd.), and ion exchange water were added and stirred for 1 hour, and then 24.5 parts by mass of the magenta aqueous pigment dispersion was further added and stirred for 1 hour.

Next, the pH of the resultant mixture was adjusted within a range of 9 to 9.8 by using a 5 mass % aqueous potassium hydroxide solution and then filtered with a filter having a pore diameter of 5 to 10 μm, thereby preparing a total of 70 parts by mass of a comparative aqueous ink (X) (magenta pigment concentration: 5% by mass).

Next, each of the aqueous inks produced in the examples and the comparative examples and the aqueous ink (X) was applied to plain paper by using bar coater #3 and dried under the condition of room temperature, producing a printed matter.

The color development of the printed patter produced by using each of the aqueous inks of the examples and the comparative examples was visually compared with the color development of the printed matter (x) produced by using the aqueous ink (X). When the printed matter produced by using each of the aqueous inks of the examples and the comparative examples had the color development equivalent to or higher than the color development of the printed matter (x), the color development was evaluated as "Good", while when the printed matter produced by using each of the aqueous inks of the examples and the comparative examples had the color development lower than the color development of the printed matter (x), the color development was evaluated as "Poor".

TABLE 1

| Evaluation result | Example 1 | Example 2 | Example 3 |
| --- | --- | --- | --- |
| Abrasion resistance | A | A | A |
| Color development | Good | Good | Good |

TABLE 2

| Evaluation result | Comparative Example 1 | Comparative Example 2 | Comparative Example 3 |
| --- | --- | --- | --- |
| Abrasion resistance | C | B | C |
| Color development | Good | Good | Poor |

The invention claimed is:

1. An ink comprising a polymer (A) having a carboxyl group or a neutralized base of a carboxyl group and a structure represented by general formula (1) below, and a polymer (B) different from the polymer (A) and dispersed in water (C) by the polymer (A),

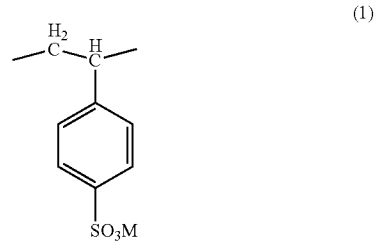

(in the general formula (1), M represents a hydrogen atom or an alkali metal).

2. The ink according to claim 1, wherein the polymer (A) is a polymer of a monomer mixture containing a monomer having a carboxyl group or acid anhydride thereof and an alkali metal salt of styrenesulfonic acid.

3. The ink according to claim 1, wherein the polymer (B) is an acrylic polymer (b).

4. The ink according to claim 1, wherein the mass ratio [polymer (A)/polymer (B)] of the polymer (A) to the polymer (B) is within a range of 1/100 to 30/100.

5. The ink according to claim 1, wherein the polymer (A) and the polymer (B) are contained within a range of 0.1% by mass to 30% by mass in total relative to the total amount of the ink.

6. The ink according to claim 1, further comprising a pigment and a pigment dispersion resin for dispersing the pigment in the water (C).

7. The ink according to claim 6, wherein the ink jet printing system is a thermal-type ink jet printing system.

8. The ink according to claim 1, wherein the ink is used for printing in an ink jet printing system.

* * * * *